United States Patent [19]

Fry et al.

[11] Patent Number: 4,960,301
[45] Date of Patent: Oct. 2, 1990

[54] DISPOSABLE LINER FOR PICKUP TRUCK BEDS

[76] Inventors: Steven A. Fry, 30052 Running Deer La., Laguna Niguel, Calif. 92677; Rodney L. Stafford, 4900 E. Chapman #13, Orange, Calif. 92669

[21] Appl. No.: 328,840

[22] Filed: Mar. 27, 1989

[51] Int. Cl.$^5$ .............................. B62D 33/02
[52] U.S. Cl. .................. 296/39.2; 224/42.42
[58] Field of Search ............. 296/39.1–39.3; 105/423; 224/42.42; 280/769, 770, 850; 150/166

[56] References Cited

U.S. PATENT DOCUMENTS

| | | | |
|---|---|---|---|
| 601,976 | 4/1898 | Murray | 296/39.1 |
| 818,257 | 4/1906 | Kennedy | 105/423 |
| 1,259,320 | 3/1918 | Tyler | 296/39.1 X |
| 1,491,955 | 4/1924 | Kennedy | 105/423 |
| 1,527,080 | 2/1925 | Ringel | 105/423 |
| 2,119,072 | 5/1938 | Cohen | 280/850 X |
| 2,270,266 | 1/1942 | Cavanagh | 280/850 |
| 2,455,587 | 12/1948 | Konrad | 224/42.42 |
| 2,912,137 | 11/1959 | Taylor | 296/39.2 X |
| 4,279,439 | 7/1981 | Cantieri | 296/39.2 |

FOREIGN PATENT DOCUMENTS

| | | | |
|---|---|---|---|
| 1260708 | 4/1961 | France | 296/39.2 |
| 0012478 | 1/1987 | Japan | 296/39.2 |

*Primary Examiner*—Dennis H. Pedder
*Attorney, Agent, or Firm*—Donald D. Mon

[57] ABSTRACT

A liner half for a pickup truck bed which liner half has a bottom panel, a sidewall panel, a front panel, and a front bottom panel. The liner half is initially flat and scored to facilitate folding and slitting as appropriate. Scores are provided to enable the folded structure to form a knee that overhangs and protects a wheel well inside the truck bed.

3 Claims, 2 Drawing Sheets

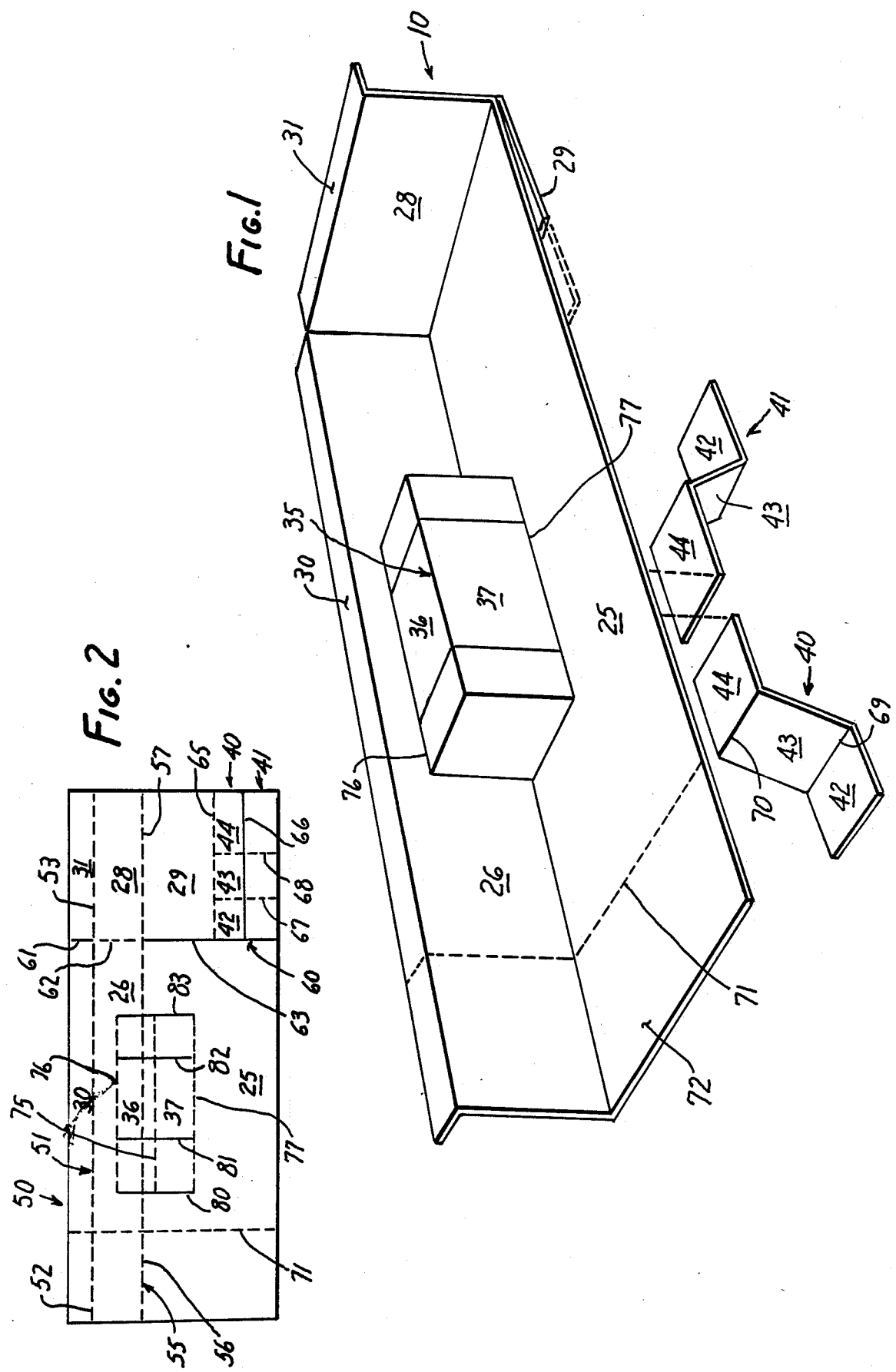

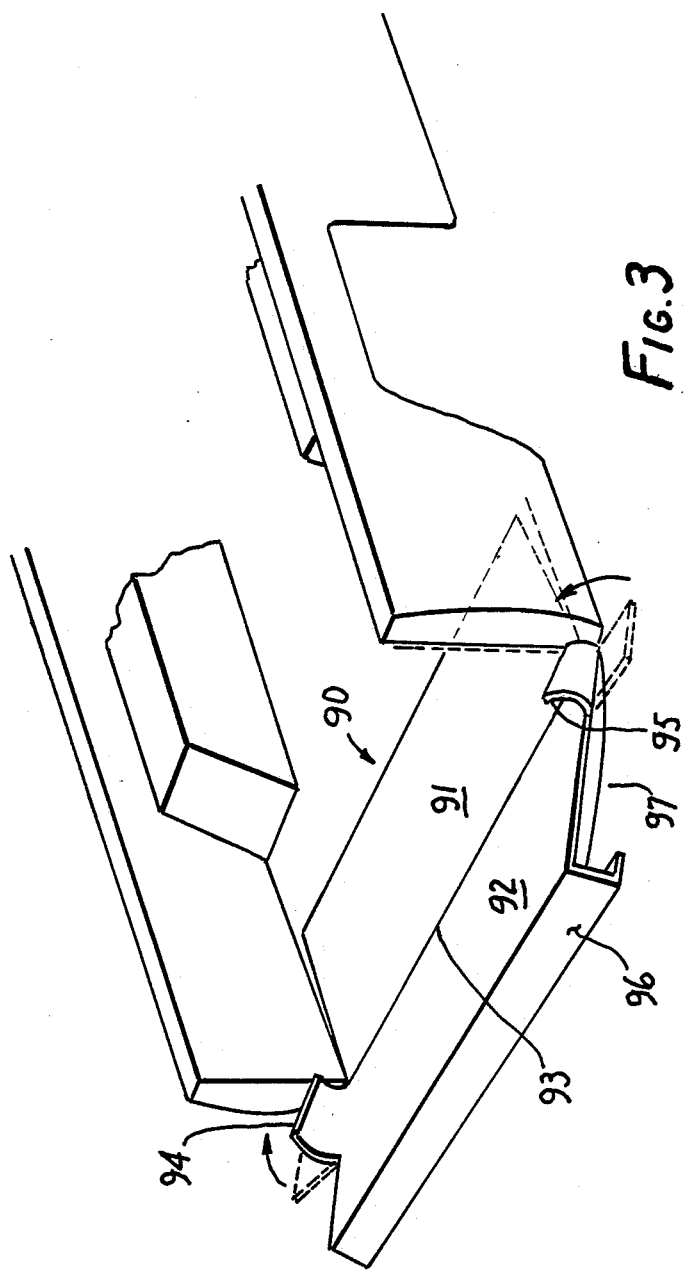

DISPOSABLE LINER FOR PICKUP TRUCK BEDS

FIELD OF THE INVENTION

This invention relates to a liner for pickup truck beds, and especially to an inexpensive liner which can be set up from flat stock.

BACKGROUND OF THE INVENTION

A pickup truck bed is used for a variety of purposes. Unless the user intends that the truck be employed exclusively for very dirty or rough uses, he will want to protect its painted surfaces from scratches, and the metal itself from dents while employing it for such uses. This preserves the surface of the bed for uses in which a clean, attractive and undamaged bed is desired, such as for recreational activities or for transportaion of persons.

Truck bed liners to protect the bed are well known. Generally they are rigidly or semi-rigidly formed to the general shape of the bed in which they are to fit. They are bulky and clumsy to handle, do not collapse for storage, and because they are intended to be relatively permanently installed, are difficult to remove. They are so difficult to remove and store that this procedure is relatively uncommon for that reason alone.

Furthermore, the hard plastics which are generally used for conventional liners not only can scar the paint, but also contribute to a significantly higher incidence of rust in the truck bed. This is because of the moisture on the surface of the truck bed which the liner keeps trapped underneath itself.

It is an object of this invention to provide a very economical pickup truck bed liner which is collapsible for shipping and storage, is easily installed and removed, and is made of materials which will not damage the bed. It typically will be used only when required to protect the bed from rough treatment, and is inexpensive enough to be disposed of afterward.

BRIEF DESCRIPTION OF THE INVENTION

A liner for a truck bed to this invention is an initially flat blank of corrugated paper, cut in a pattern and scored to fold and generally fit into the truck bed's interior.

According to a preferred but optional feature of the invention, the paper can be coated or otherwise reinforced or supplemented for moisture resistance and toughness of surface so as to give increased resistance to abrasion and penetration.

According to yet another preferred but optional feature of the invention, the blank is scored and cut so that knees can be formed by the installed liner to accommodate structures which enter the bed, such as wheel wells, so as to cover or bound them, at least in part.

The above and other features of the invention will be fully understood from the following detailed description and the accompanying drawings, in which:

BRIEF DESCRIPTION OF THE DRAWINGS

FIG. 1 is a perspective view of the set up configuration of the preferred embodiment of the invention; and FIG. 2 is a plan view of a blank which can be folded up to form the structure of FIG. 1, this blank forming one half of a completed liner installation;

FIG. 3 is a perspective view of an optional part of the invention.

DETAILED DESCRIPTION OF THE DRAWINGS

The presently preferred embodiment of a liner according to this invention is shown in the drawings. FIG. 1 shows a liner half 10 in its set-up configuration, ready to be placed in the bed of a pickup truck. The flat blank to form this structure is shown in FIG. 2.

A conventional truck bed has a floor, two forwardly extending sidewalls, a forward wall, and often a tailgate. The sidewalls often have an internally overhanging ledge.

Depending on the general layout, the floor will be generally rectangular. In most trucks, however, the bed is wider than the well spacing, and wheel wells intrude into the bed, rather like knees. They constitute discontinuities in the rectangular floor pattern and in the side wall. This invention is adapted to accommodate a wide range of such arrangements.

In its installed configuration, liner half 10 has a bottom panel 25, a sidewall panel 26, a front wall panel 28, and a front bottom panel 29.

A flap 30 can be fitted beneath the overhanging flange, or can overlay it if preferred. A flap 31 is provided to fit beneath or overlay an overhanging flange on the forward wall, if there is one. If there is not, it may be folded out of the way or be laid flat against it.

when the bed in which the liner fits is not impeded by wheel wells, the wall panels, and the flaps when provided, are sufficient. If wheel wells are to be accommodated, then a knee 35 is provided. This knee folds out and over the wheel well, having knee panels 36 and 37. This will leave the front and back faces of the wheel wells unprotected, but with its top covered.

Optionally, fillers 40, 41 can be placed over the wheel wells beneath the line to at least partially to fill in these gaps. Preferably the fillers have three segments, segment 42 to fit between the liner and the floor, segment 43 to fit in the gap, and segment 44 to fit between the wheel well and the liner.

Although the liner could in theory be provided in a single piece, perhaps folded down its longitudinal center line so as to include the mirror image of the structure of FIG. 1, manufacturing, shipping and stocking considerations make this very impractical. It is better to provide the liner as a pair of longitudinal halves, one like that of FIG. 1, and the other its mirror image. When this is done, the liner can be shipped in two smaller pieces. The dimensions will preferably be such that the halves overlap slightly, but if preferred, they could just abut, and tape could be applied to connect them and close any gap.

The liner is preferably made of multi-ply paper board which includes at least one corrugated layer. Such material has substantial bearing and tear strength. Application of a material such as a curable resin can toughen the surface to increase its resistance to abrasion and penetration. Flat inexpensive foldable materials other than cardboard can, of course, be used.

FIG. 1 shows blank 50 of FIG. 2 in the set up condition. In order to set up material of this sort with accurate and neat folds, scores should be provided. These can be made with the use of steel dies which sufficiently indent the material so as to facilitate making the fold. In fact these scores could also provide spaced apart perforations partway or even entirely through the material. This would make folding easier, but might be objectionable if sand or other pulverulent material is being carried. However, at places where a cut will certainly be made, then perforations or even a slit will best be formed. Persons who use this liner will generally have a knife with which they can readily cut along a scored or perforated fold or release line. The essential feature of this invention is the provision of fold-locating or fold facilitating means, and cut-locating or cut-facilitating means. The invention does not require that any part of the structure necesssarily need be completely slit, although a slit structure does fall within the meaning of both cut-facilitating and cut-locating means. The term "score" will be used generically for all of these, leaving it to the user and manufacturer to decide whether the score should penetrate the material totally to form a slit, or only a non-penetrating depression or a series of perforations to facilitate making a fold.

Score 51 has segments 52 and 53. Segment 52 is at the joinder of flap 30 and sidewall panel 26. Segment 53 is the joinder of flap 31 and front wall 28.

Score 55 has segments 56 and 57. Segment 56 is at the joinder of sidewall 26 and bottom 25. Segment 57 is at the joinder of front wall panel 28 and front bottom panel 29.

Score 60 has segments 61, 62 and 63. Segment 61 will ordinarily be cut through, because it forms edges of tabs 30 and 31 which will nearly always be separated when the liner is installed. Segment 62 is at the joinder of sidewall panel 26 and front wall panel 28. It always will form the dihedral edge of a fold. Segment 63 is best cut, because it forms edges of bottom panel 25 and of the front bottom panel 29.

Scores 65 and 66 are at edges of fillers 40 and 41. Because these fillers are not always used, it is best for them to be perforated, at least. Scores 67 and 68 facilitate forming dihedrals 69, 70 when the fillers are used.

Score 71 is provided to facilitate cutting of portion 72 at the rear of the liner when it is used in a short bed. Alternatively, it might form a fold to make a wall at the rear end of the liner.

Segment 56 of score 55 extends to score 60, because often the knee will not be used. However, when a knee is used, an additional score 75 may be and usually will be formed so the dimensions of knee panels 36 and 37 can be selected. This is a matter of dimensions which is determined by the dimensions of the wheel well. Knee scores 76, 77 are found respectively in the sidewall panel 26 and bottom panel 25 to facilitate folding up the knee structure shown in FIG. 1.

Scores 80, 81, 82 and 83 are provided to determine the length of the knee. If the liner is intended for only one bed and bed size, then only scores 80 and 83 need be provided. The choice whether to cut these or not is arbitrary, in view of the fact that the liner might also be used in a bed that does not have a wheel well. They are shown as cuts because the fold can still be made along score 55, and having cuts already at these locations where needed is quite a convenience.

Segments 81 and 82 are locating means for wheel wells of different sizes, and if only scored will be cut when the bed is fitted to the respective size.

Blanks of this type are quite large. A single blank which could form an entire liner would when flat be too large for practical shipping, inventory, and shelf stocking. Furthermore, a single piece this large would fold clumsily, and would be rather difficult to handle during installation. For these reasons it is better to provide this product in mirror-image halves. If preferred, however, a single fold can conveniently reduce the shipping bulk. Such a fold could be along score 55, for example.

The structure shown in FIGS. 1 and 2 lines the bottom, front, and sidewalls of the truck bed. One can readily devise an extension of panel 25 to fold up against the tailgate. However, this is a practical product which must be manufactured in plants of relatively modest size, shipped through commercial channels, and installed by real people. Often enough, these real people include young women, and others whose ability to manipulate very large sized objects is limited. Therefore as shown in FIG. 3, a separate rear-end liner 90 is provided.

A suitable blank includes a rear bottom panel 91, and tailgate panel 92. This rear bottom panel can lay atop or beneath panel 25, preferably beneath it, and score 93 facilitates making the fold between panels 91 and 92.

A part of tabs 94, 95 are formed at opposite sides of panel 92. They may or may not have a scored edge. These tabs may be placed between the sidewalls of the truck bed and panels 26, and will assist in holding the tailgate panel erect.

Flap 96 can be folded over the tailgate 97, or simply folded against tailgate panel 92 as preferred. This will complete the lining of the truckbed. If desired, the tabs can be located close enough to the bottom so as to form a fold that would assist in retaining granular material.

The illustrated liner half is adapted for use with truck beds with or without wheel wells, with beds of different length and width, and with beds that do or do not have flanges. It is easy to manufacture and install, and is sufficiently economical that it can be discarded after it is too worn.

This invention is not to be limited by the embodiments shown in the drawings and described in the description, which is given by way of example and not of limitation, but only in accordance with the scope of the appended claims.

I claim:

1. A liner half for forming part of a liner to cover a pickup truck bed, said truck bed having a bottom, two side walls, and a front wall, said liner half being formed from an initially flat blank folded to form a conforming bottom panel, a sidewall panel, a front wall panel, and a front bottom panel, a dihedral fold edge being formed between the sidewall panel and the front wall panel, and between the front wall panel and the front bottom panel, the blank having scores to facilitate the location and folding of the liner half to form said dihedral fold edges; said blank including contiguous to its front bottom panel, a pair of filler panels detachable therefrom at a score, said filler panels being scored to facilitate folding to fit the filler panels closer to the wheel well.

2. A liner half according to claim 1 in which knee scores are formed within said sidewall panel and said bottom panel to facilitate the separation from them of a pair of knee panels erected into the dihedral angle formed by the sidewall panel and a bottom panel to cover a wheel well inside the truck bed.

3. A liner half according to claim 2 in which additional scores are formed between said knee scores to facilitate the selection and formation of a knee of different length.

* * * * *